MILES FISK.
Improvement in Churns.
No. 121,604.                                  Patented Dec. 5, 1871.
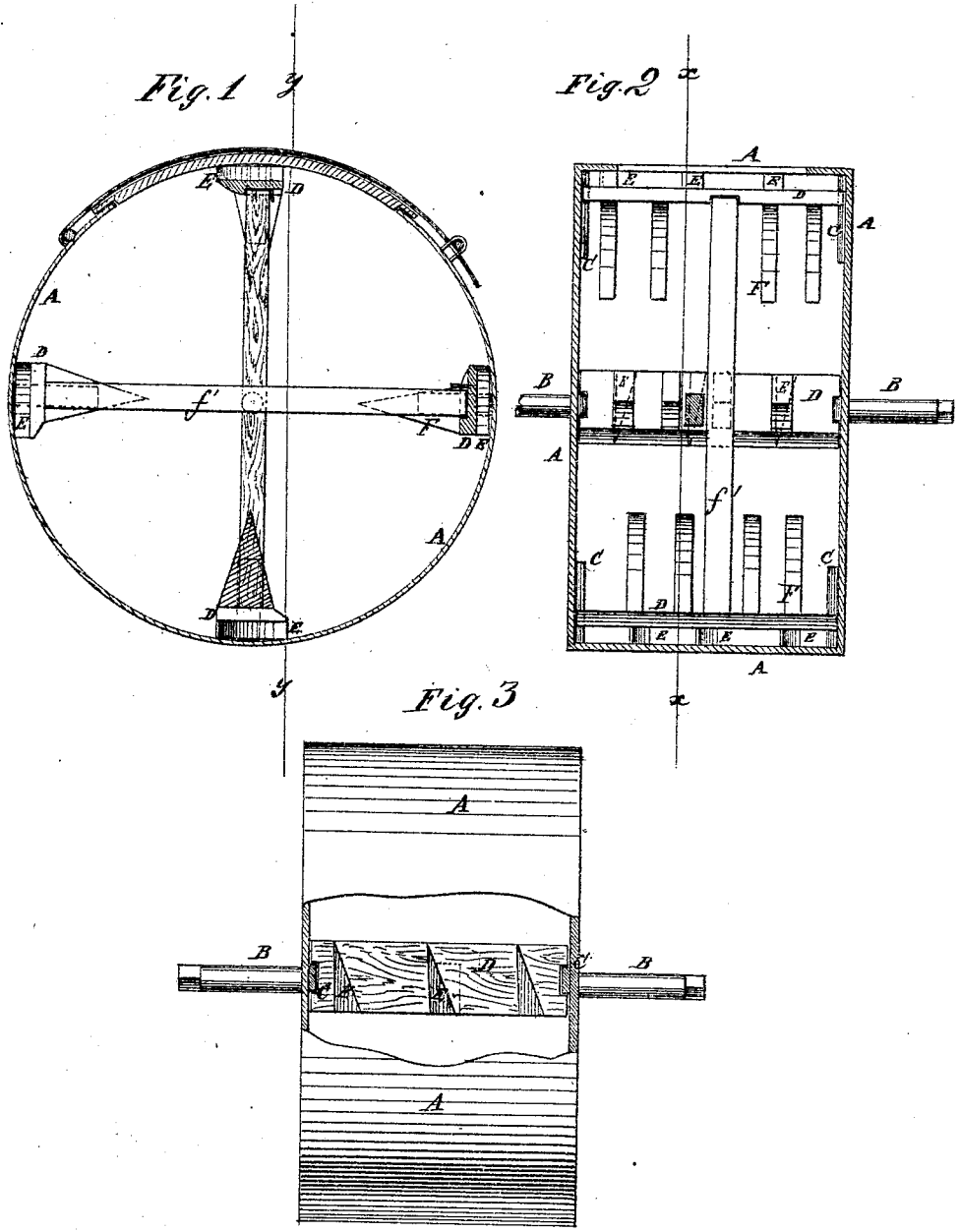

123,604

UNITED STATES PATENT OFFICE.

MILES FISK, OF ADRIAN, MICHIGAN.

IMPROVEMENT IN CHURNS.

Specification forming part of Letters Patent No. 121,604, dated December 5, 1871.

*To all whom it may concern:*

Be it known that I, MILES FISK, of Adrian, in the county of Lenawee and State of Michigan, have invented a certain Improvement in Churns; and I do hereby declare that the following is a full, clear, and exact description thereof, which will enable others skilled in the art to make and use the same, reference being had to the accompanying drawing forming part of this specification.

Figure 1 is a detail sectional view of my improved churn taken through the line $x\ x$, Fig. 2. Fig. 2 is a detail sectional view of the same taken through the line $y\ y$, Fig. 1. Fig. 3 is a side view of the same, part being broken away to show the construction.

Similar letters of reference indicate corresponding parts.

My invention has for its object to furnish an improved churn, simple in construction, conveniently operated, and effective in operation, bringing the butter thoroughly and quickly; and it consists in the construction and combination of the various parts of the machine, as hereinafter more fully described.

A represents the case or body of my improved churn, which is made in the form of a short cylinder. To the center of each end of the cylinder or body A is securely attached a journal, B, which may revolve in any suitable support or frame-work. The end of one or both of the journals B is squared off to receive a crank for revolving the said churn-body A. In one side of the body A is formed an opening to allow the milk to be conveniently put in and the butter taken out, which opening should be so large as to allow the beaters to be conveniently put in and taken out through it. To the inner sides of the ends of the body A are secured, or to them are attached radial ribs or arms C to receive the beater-plates D, the ends of which are notched to fit upon the said ribs C. The forward edges of the plates D are beveled off, as shown in Fig. 1, to enable them to pass through the milk freely. To the outer sides of the plates D are attached wedge-shaped blocks E, which rest against the inner concave surface of the sides of the body A to prevent the plates D from coming in contact with said sides, and thus allow space for the milk to pass between them and the said plates D. The blocks E are set in an inclined position and pointed end forward, as shown in Fig. 3, and are so arranged that no one of them may follow in the track of another, and are made of such a width that if laid side by side they would fill the space between the ends of the body A, so that no part of the milk will be left unacted upon by said blocks. To the plates D are attached wedge or other-shaped teeth F, which project inward radially, as shown in Fig. 1. The teeth F are so arranged that no tooth may follow the path of another tooth. The teeth F are made of such a width that taken together their united width may equal the length of the body A, so that all parts of the milk may be operated upon by said teeth. The middle teeth $f'$ of two of the plates D are extended to enter grooves in the opposite plates D, as shown in Figs. 1 and 2, where they may be secured in place by pins or keys inserted in holes in said plates D, as shown in Fig. 1. The long teeth $f'$ thus serve as braces or stays, and at the same time as handles in putting in or taking out.

Having thus described my invention, I claim as new and desire to secure by Letters Patent—

The radial ribs or flanges C, plates D, inclined wedge-shaped blocks E, teeth F, and long teeth or braces $f'$, constructed and arranged in connection with each other and with the cylindrical case or body A, substantially as herein shown and described, and for the purpose set forth.

The above specification of my invention signed by me this 15th day of September, 1871.

MILES FISK.

Witnesses:
   JAMES T. GRAHAM,
   T. B. MOSHER.                   (45)